United States Patent
Comin et al.

(10) Patent No.: US 8,152,137 B2
(45) Date of Patent: Apr. 10, 2012

(54) RELIEF VALVE IN A TURBOMACHINE

(75) Inventors: Francois Jean Comin, Melun (FR); Claude Marcel Robert Majeux, Saclay (FR)

(73) Assignee: SNECMA, Paris (FR)

( * ) Notice: Subject to any disclaimer, the term of this patent is extended or adjusted under 35 U.S.C. 154(b) by 756 days.

(21) Appl. No.: 12/267,875

(22) Filed: Nov. 10, 2008

(65) Prior Publication Data
US 2009/0121172 A1   May 14, 2009

(30) Foreign Application Priority Data

Nov. 13, 2007   (FR) ...................................... 07 07944

(51) Int. Cl.
    *F61K 1/16*   (2006.01)
(52) U.S. Cl. .......................... 251/301; 277/637; 251/298
(58) Field of Classification Search .......... 251/298–301, 251/326; 277/630, 637, 645; 49/493.1, 498.1
See application file for complete search history.

(56) References Cited

U.S. PATENT DOCUMENTS

| | | | |
|---|---|---|---|
| 2004/0011988 A1* | 1/2004 | Chini et al. | 251/301 |
| 2006/0192165 A1* | 8/2006 | Matkovich et al. | 251/149.1 |
| 2006/0208213 A1* | 9/2006 | Turnau et al. | 251/309 |

FOREIGN PATENT DOCUMENTS

| | | | |
|---|---|---|---|
| DE | 4423370 A1 | * | 1/1996 |
| DE | 19516927 A1 | * | 11/1996 |
| EP | 0 902 179 A2 | | 3/1999 |
| EP | 0983885 A2 | * | 3/2000 |
| EP | 1 398 464 A2 | | 3/2004 |
| EP | 1 486 678 A2 | | 12/2004 |
| FR | 2550848 A1 | * | 2/1985 |
| FR | 2 664 018 | | 1/1992 |
| GB | 2245656 A | * | 1/1992 |

OTHER PUBLICATIONS

Machine Translation of DE 19516927 A1.*
Machine Translation of DE 4423370 A1.*
Machine Translation of FR 2550848 A1.*

* cited by examiner

Primary Examiner — John Fristoe, Jr.
Assistant Examiner — Jessica Cahill
(74) Attorney, Agent, or Firm — Oblon, Spivak, McClelland, Maier & Neustadt, L.L.P.

(57) ABSTRACT

A relief valve in a turbomachine is disclosed. The valve includes a gate designed to be mounted so as to pivot about a shaft for the opening and closing of an orifice for the passage of air, a seal, and an attachment device for attaching the seal to the peripheral edge of the gate. The gate and the attachment device are made of a plastic and formed of a single piece or secured to one another by welding or bonding.

12 Claims, 3 Drawing Sheets

RELIEF VALVE IN A TURBOMACHINE

The present invention relates to a relief valve in a turbomachine such as an aircraft turbojet or turboprop.

BACKGROUND OF THE INVENTION

Relief valves are usually mounted on the intermediate casing of the turbomachine, between the low-pressure compressor and the high-pressure compressor, in an annular space extending between the main flow stream and the bypass flow stream.

These relief valves are evenly distributed about the longitudinal axis of the turbomachine and each comprise a gate that can be moved relative to the intermediate casing, between a closed position of an orifice for the passage of air formed in the intermediate casing and an open position of this orifice. The opening of these gates makes it possible to discharge a portion of the main air flow in certain operating conditions of the turbomachine, this air being reinjected into the bypass flow or supplying systems for cooling or ventilating components of the turbomachine.

In certain embodiments, the gates of the relief valves have a substantially parallelepipedal shape and the corresponding orifices of the intermediate casing have a shape that matches that of the gates. An elastomer seal that is generally U-shaped extends along the peripheral side and downstream edges of each gate and is designed to interact with a matching portion of the edge of the orifice of the intermediate casing in order to provide the seal around the gate in its position of closure of this orifice.

In the prior art, this seal is attached to the gate by means of a U-shaped plate which is fitted to the seal and which is attached to the gate by rivets passing through the seal. The seal is therefore kept clamped onto the peripheral edge of the gate. The gate and the plate are usually made of metal, for example of aluminium.

Each gate comprises pivoting means formed by lugs which extend from an upstream end portion of the gate radially outwards. These lugs comprise at their radially inner ends coaxial cylindrical bores for mounting bearings for centring and guiding a first pivot supported by the intermediate casing, and defining the pivoting axis of the gate. These lugs also comprise at their radially outer ends coaxial cylindrical bores for mounting bearings in which a second pivot is engaged, mounted at the end of a link rod which controls the pivoting of the gate about the first pivot. The bearings mounted in the bores of the lugs are usually made of steel or polymer.

This relief valve therefore comprises a relatively high number of components (twenty five in total in one particular embodiment: a gate, four bearing bushes, a seal, a plate for attaching the seal, nine rivets, and nine spacers), which results in a relatively high weight and cost, the manufacture and assembly of these various parts being relatively long.

SUMMARY OF THE INVENTION

The invention makes it possible to avoid these disadvantages in a simple, effective and economical manner.

Accordingly, it proposes a relief valve of a turbomachine, comprising a gate designed to be mounted so as to pivot about a shaft between a closed position of an orifice for the passage of air and an open position of this orifice, a seal extending along at least a portion of the peripheral edge of the gate, and means for attaching the seal to the peripheral edge of the gate, characterized in that the gate and the seal attachment means are made of a plastic and are formed of a single piece or are welded or bonded together.

According to the invention, the gate and the attachment means are made of a plastic, which makes it possible to markedly reduce the weight of the relief valve. In a simple manner, the gate and the attachment means may be made in a single piece. As a variant, the gate and the attachment means are secured to one another by welding, for example by ultrasonic welding, or by bonding their materials together.

In these two embodiments of the invention, the gate and the attachment means form a single-piece element which attaches the seal to the gate without making use of additional attachment means of the rivet or similar type.

Producing the gate and the attachment means in an appropriate plastic has another advantage: the inner cylindrical surfaces of the bores of the lugs of the valve form the means for centring and guiding the aforementioned first and second pivots, which avoids the bushes for centring and guiding these pivots. When the lugs are formed in a single piece with the gate and the means for attaching the seal, the valve according to the invention then comprises only two components (the gate and the seal) compared with twenty-five in the prior art.

The gate and/or the means for attaching the seal may be made of a thermoplastic material which may or may not be reinforced with fibres such as glass fibres. The thermoplastic material is for example of the PEEK (polyetheretherketone) or ULTEM® (polyetherimide) type.

The gate and/or the attachment means may be made by injection moulding.

According to one embodiment of the invention, the seal is overmoulded onto the gate.

As a variant, the seal comprises orifices traversed by mounting posts of an attachment plate, these mounting posts being secured to the gate by their free ends being bonded or welded to the gate.

The attachment plate comprises a rim which extends along a peripheral edge of the seal and which is welded or bonded to the gate.

The attachment means are for example generally U-shaped and have a substantially S-shaped section.

The invention also relates to a turbomachine, such as an aircraft turbojet or turboprop, characterized in that it comprises at least one relief valve as described above.

BRIEF DESCRIPTION OF THE DRAWINGS

The invention will be better understood and other features, details and advantages of the present invention will appear more clearly on reading the following description given as a non-limiting example and with reference to the appended drawings in which.

MORE DETAILED DESCRIPTION

Figure 1:
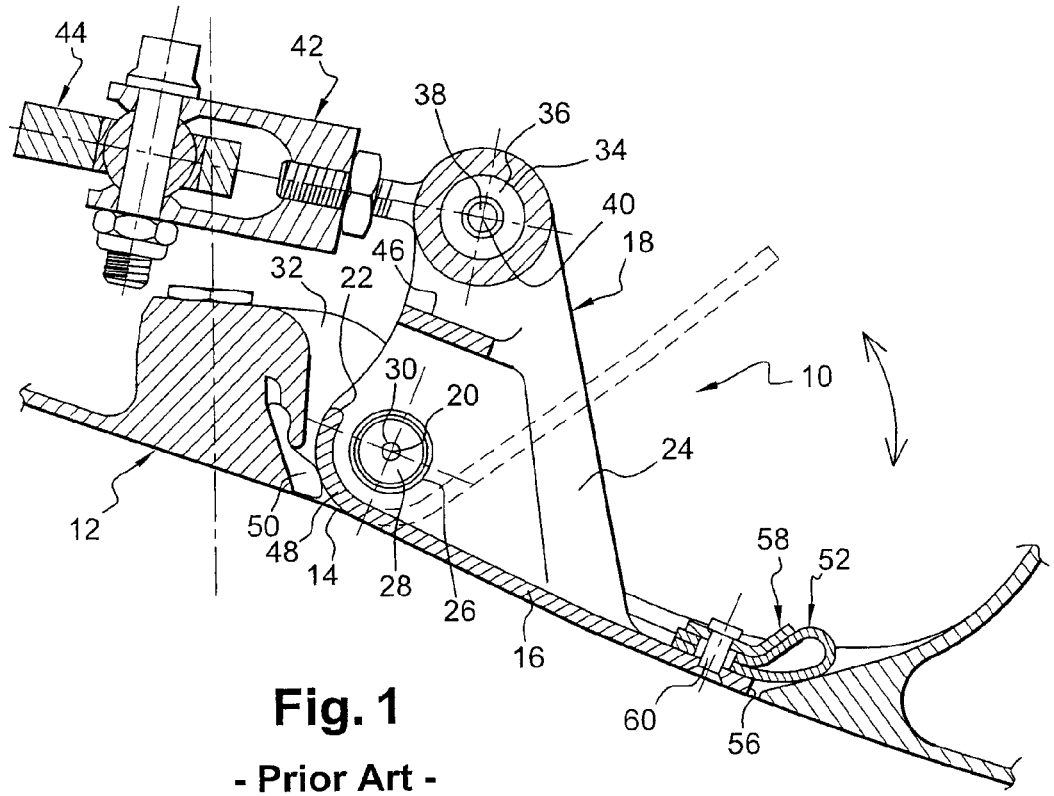
FIG. 1 is a schematic view in section of a turbomachine relief valve according to the prior art.
Figure 2:
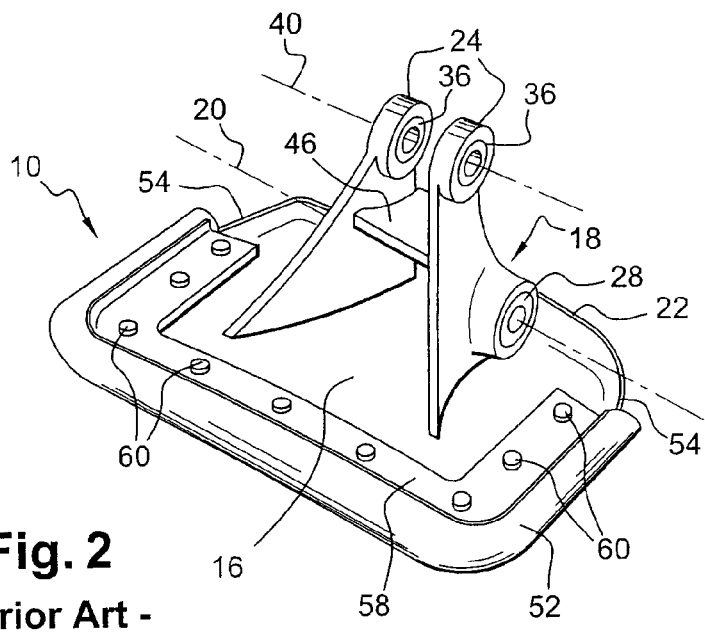
FIG. 2 is a view in perspective of the relief valve of FIG. 1.

Reference is made first of all to FIGS. 1 and 2 which represent a relief valve 10 of a turbomachine, such as an aircraft turbojet or turboprop, according to the prior art.

This relief valve 10 is mounted on an intermediate casing 12 of the turbomachine which is arranged between a low-pressure compressor, situated upstream and a high-pressure compressor, situated downstream, these compressors not being shown in the drawings.

The intermediate casing 12 of which only a portion is visible in FIG. 1 has a generally cylindrical or frustoconical shape and internally delimits the stream of the main flow of the turbomachine.

The casing 12 comprises orifices 14 of substantially parallelepipedal shape which are each associated with a relief valve 10. The casing 12 comprises for example twelve orifices 14 evenly distributed about the longitudinal axis of the turbomachine and is therefore fitted with twelve relief valves 10.

Each relief valve 10 comprises a gate 16 which has a substantially parallelepipedal shape matching that of a corresponding orifice 14 of the casing in order to close off this orifice. The valve 10 also comprises means 18 for pivoting this gate about a transverse axis 20 which is substantially tangential to the intermediate casing 12 and which extends along the peripheral upstream edge 22 of the gate, on the outside of the latter. The gate 16 can be moved by pivoting relative to the casing 12 between a closed position of the orifice 14 of the casing (represented by continuous lines in FIG. 1), in which the inner surface of the gate 16 is aligned with that of the intermediate casing 12, and an open position of this orifice (represented in dashed lines), in which the gate is inclined at 60° approximately outwards relative to its closed position.

The means 18 for pivoting the gate 16 comprise two lugs 24 which are formed in a single piece with the gate and which extend substantially radially outwards from the outer surface of the gate.

The lugs 24 are substantially symmetrical relative to a plane passing through the longitudinal axis of the turbomachine and between the two lugs 24, this plane corresponding substantially to the sectional plane of the drawing of FIG. 1.

Each of these lugs 24 comprises, at its radially inner end, a cylindrical bore 26 which extends coaxially with the axis 20 for pivoting of the gate 16 and which receives a bush 28 forming a bearing. The axis 20 of pivoting of the gate is defined by a cylindrical pivot 30 which is engaged in the bushes 28 of the lugs 24 of the valve and which is attached by appropriate means 32, at each of these ends, to the intermediate casing 12.

Each lug 24 also comprises at its radially outer end a cylindrical bore 34 for mounting another bush 36 forming a bearing, the bushes 36 being aligned coaxially with one another and receiving a second pivot 38. This second pivot 38 defines an axis 40 substantially parallel to the axis 20 for the pivoting of the gate 16 and is mounted at one end of at least one link rod 42 whose other end is connected via a swivelling connection to an appropriate means 44 for controlling the axial movement upstream or downstream of the link rod.

The link rod 42 is represented in FIG. 1 in its maximal downstream axial position, which corresponds to the closed position of the gate 16, and can be moved to an upstream position for which the gate is in its open position represented in dashed lines in FIG. 1.

The lugs 24 are also connected together by a transverse wall 46 which extends between the lugs, substantially halfway up the latter.

The upstream end portion 48 of the gate is curved outwards, and its radius of curvature is centred on the axis 20 of pivoting of the gate 16. This end portion 48 has an outer cylindrical surface which interacts sealingly with a seal 50 attached to the intermediate casing 12, when the gate pivots. This seal 50 extends along the upstream edge of the orifice 14 of the casing 12.

In the closed position represented in continuous lines in FIG. 1, the gate 16 also interacts sealingly with the edge of the orifice 14 of the casing 12 by means of another generally U-shaped seal 52 which extends along the lateral peripheral edge 54 and downstream peripheral edge 56 of the gate.

This seal 52 comprises a flat portion which extends above the peripheral edges 54, 56 of the gate and which is kept clamped on this gate by an attachment plate 58, and a swelling or a domed portion which extends around the edges 54, 56 of the gate, outside the latter, and which presses on the corresponding lateral and downstream edges of the orifice 14 of the casing, in the closed position of the gate 16 (FIG. 1).

The plate 58 for attaching the seal 52 is generally U-shaped and extends over the flat portion of the seal 52. It is attached to the gate 16 by means of several rivets 60 which extend through corresponding orifices of the plate, the gate 16, and the seal.

The relief valve 10 of the prior art therefore consists of several components (twenty-five in total in the particular case shown: one gate 16, four bushes 18, 36, one seal 52, one plate 58 for attaching the seal, nine rivets 60, and nine spacers not visible) that are made of different materials. This valve is heavy and its assembly is long and complex.

The invention makes it possible to remedy this problem by producing the gate and the means for attaching the seal out of a plastic, which also makes it possible to provide many other advantages described above.

Figure 3:
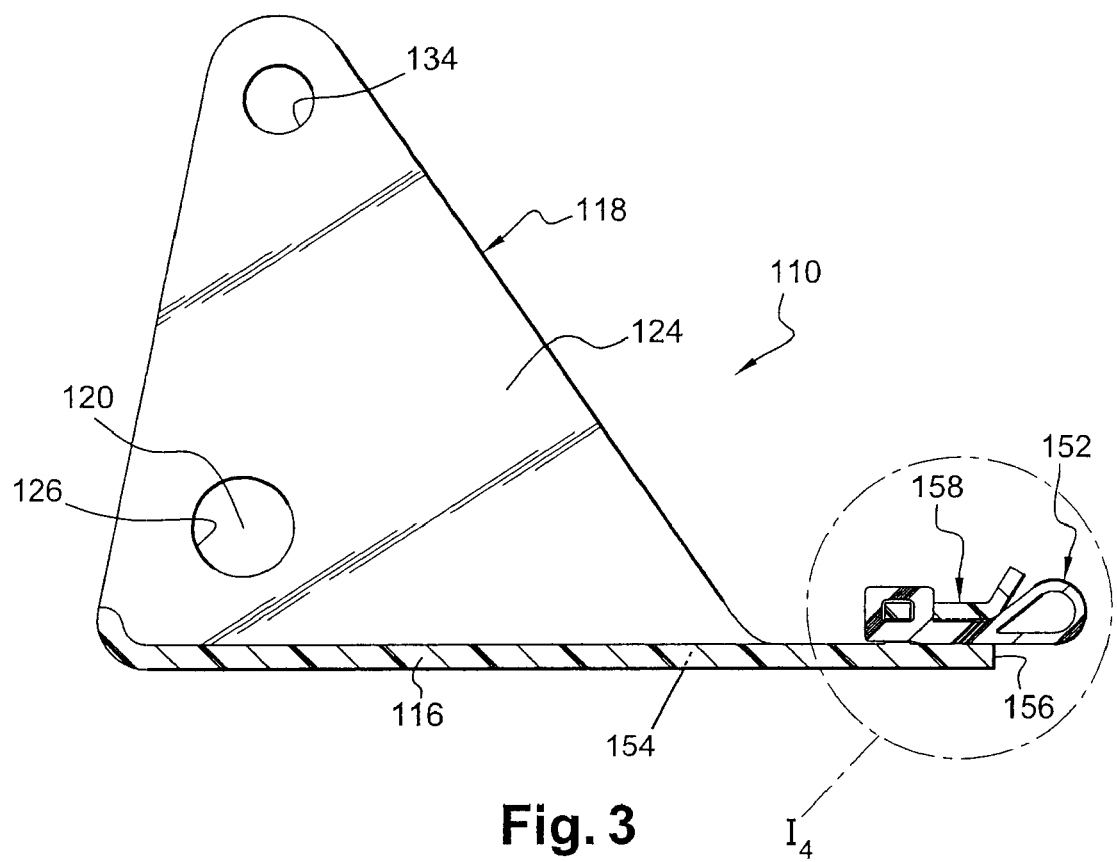
FIG. 3 is a schematic view in section of a turbomachine relief valve according to the invention.
Figure 4:
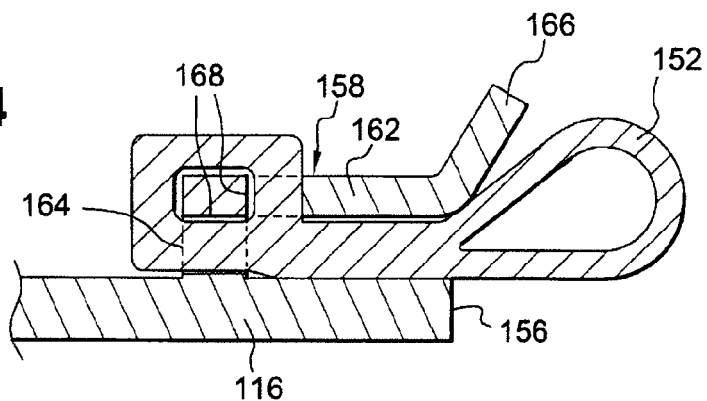
FIG. 4 is a view on a larger scale of the detail $I_4$ of FIG. 3.

In the exemplary embodiment represented in FIGS. 3 and 4, the gate 116 and the plate 158 for attaching the seal 152 are formed in a single piece and are therefore made of the same plastic.

The gate 116 and the plate 158 may be obtained by injection moulding an appropriate plastic, such as a thermoplastic material, for example of the PEEK (polyetheretherketone) or ULMET® (polyetherimide) type. The material of the gate and of the plate may also be reinforced with fibres such as glass fibres.

As in the prior art, the plate 158 is generally U-shaped. In this instance it also has a substantially S-shaped section, and comprises an intermediate wall 162 which extends along the peripheral edges 154, 156 of the gate, above the latter. This intermediate wall 162 is connected at its ends situated on the side opposite to the peripheral edges 154, 156 to the radially outer end of a rim 164 that is substantially radial relative to the axis of the turbomachine, the radially inner end of this rim 164 being connected to the gate 116. The intermediate wall 162 is also connected at its other end, situated on the side of the peripheral edges 154, 156 of the gate, to an inclined wall 166 which extends downstream and outwards.

The intermediate wall 162 and the radial rim 164 of the plate comprise orifices 168 for the passage and anchoring of the seal 152 which is directly overmoulded between the plate 158 and the lateral and downstream peripheral edges of the gate. When the seal is overmoulded, material of this seal 152 passes through the orifices 168 of the plate and covers a portion of this plate, for example the zone of connection between the intermediate wall 162 and the radial rim 164 of the plate situated between the orifices 168, as can be seen in FIG. 4.

Figure 5:
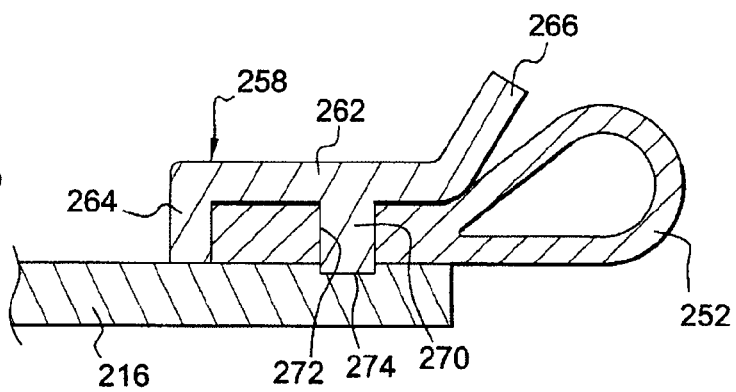
FIG. 5 is a view corresponding to FIG. 4 and represents a variant embodiment of the invention.
Figure 6:
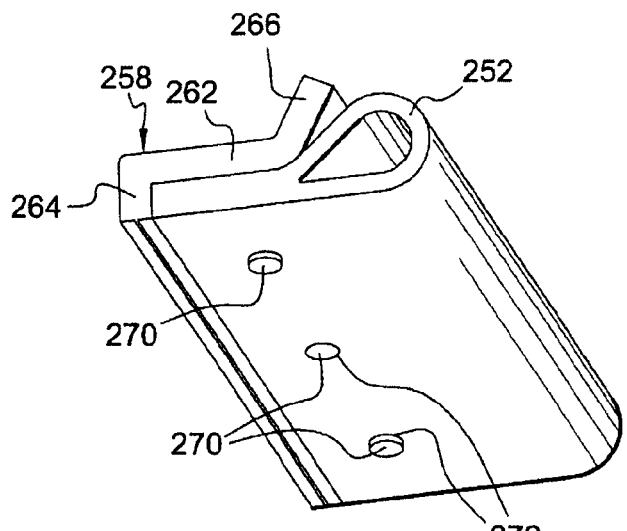
FIG. 6 is a schematic view in perspective of the seal and the means for attaching this seal of the variant embodiment of FIG. 5.

In the variant embodiment of FIGS. 5 and 6, the plate 258 and the gate 216 are formed independently of one another, the plate being fitted and attached to the gate in order to trap the seal 252 which is substantially identical to that of the prior art.

The plate 258 may be formed of a plastic identical to or different from that of the gate. The material of the gate and/or of the plate may be one of those described above with reference to FIGS. 3 and 4.

The plate 158 has a shape comparable in section to that of the plate 158 of FIGS. 3 and 4, and comprises an inclined or oblique wall 266 connected via an intermediate wall 262 to a radial rim 264.

The radial rim 264 of the plate rests at its radially inner free end on the outer surface of the gate. The plate is secured to the gate by bonding the plate to the gate, at this bearing or contact zone.

The plate also comprises mounting posts 270 formed as a single piece with the plate, these mounting posts 270 traversing the corresponding orifices 272 of the seal 252 and also being secured to the gate by bonding their free ends to the gate 216.

The mounting posts 270 extend from the inner surface of the intermediate wall 262 of the plate to the gate 216, and have a height that is slightly greater than the thickness of the flat portion of the seal 252, so that the free ends of these mounting posts protrude from the seals when they are engaged in the orifices 272 of this seal (FIG. 6). The gate 216 comprises, on its outer surface, a series of blind holes 274 whose diameter and depth are determined according to the diameter of the mounting posts 270 and the height of the ends of the mounting posts which protrude from the seal. During the mounting of the plate 258 and the seal 252 onto the gate, the mounting posts 270 of the plate are engaged in the orifices 272 of the seal (FIG. 6), then the free ends of the mounting posts are engaged in the blind holes 274 of the gate so as to define a correct mounting position of the seal and of the plate on the peripheral edge of the gate.

In order to bond the free ends of the mounting posts 270 to the bottom of the blind holes 274, adhesive is first placed in the holes 274 or on the free ends of the mounting posts.

As a variant, the radial rim 264 and the free ends of the mounting posts 270 of the plate 258 are welded to the gate 216 of the relief valve. The welding is for example carried out by means of ultrasonic waves transmitted to the aforementioned contact zones through the material of the gate and/or of the plate.

The number of mounting posts 274 of the plate is for example identical to the number of rivets 60 used in the prior art (nine in FIG. 2), these mounting posts being evenly distributed along the upstream peripheral edges and lateral edges of the gate.

When the gate 116, 216 and the plate 158, 258 of the relief valve are made of an appropriate plastic such as those described above, it is not necessary to provide bushes for centring and guiding the pivots 30, 38 as is the case in the prior art.

The radially inner and outer bores 126, 134 provided on the lugs 124 of the valve for the passage of the pivots 30, 38 may each have a cylindrical surface designed to centre and guide a pivot directly. In this case, each lug comprises two bores, radially inner and outer respectively, comprising inner cylindrical surfaces for centring and guiding the pivots 30, 38, each bore having a diameter that is determined so that the corresponding pivot is mounted adjusted in this orifice.

In this case, the relief valve of the exemplary embodiment of FIGS. 3 and 4 comprises only two parts (the seal 152 and the gate 116 formed in a single piece with the plate 158 for attaching the seal—FIG. 3), and the relief valve of the variant embodiment of FIGS. 5 and 6 comprises three parts (the seal 252, the plate 258 and the gate 216).

The invention claimed is:

1. A relief valve in a turbomachine, comprising:
   a gate designed to be mounted so as to pivot about a shaft between a closed position of an orifice for the passage of air and an open position of this orifice:
   a seal extending along at least a portion of a peripheral edge of the gate; and
   means for attaching the seal to the peripheral edge of the gate, said attachment means comprising a plate extending along at least a portion of the peripheral edge of the gate and having a substantially S-shaped section, said plate comprising an intermediate wall extending parallel to the peripheral edge of the gate, a first end of said intermediate wall being connected to a first end of a rim extending along the peripheral edge of the gate and perpendicular to the gate and to the intermediate wall, said rim having a second end opposite to its first end and connected to the gate, said intermediate wall being further connected via a second end opposite to its first end to an inclined wall extending around the peripheral edge of the gate and in a direction opposite to the gate, said seal being clamped between the intermediate wall and the peripheral edge of the gate and having a portion which extends around the peripheral edge of the gate,
   wherein the gate and the seal attachment means are made of a plastic and are formed of a single piece or are welded or bonded together.

2. The relief valve according to claim 1, wherein at least one of the gate or the attachment means are made of a thermoplastic material that is reinforced with fibers.

3. The relief valve according to claim 1, wherein at least one of the gate or the attachment means are made by injection molding.

4. The relief valve according to claim 1, wherein the gate and the attachment means are secured by ultrasonic welding.

5. The relief valve according to claim 1, further comprising at least one lug formed of a single piece with the gate and at least one bore having an inner cylindrical surface for centering and guiding a pivot.

6. A turbomachine comprising at least one relief valve according to claim 1.

7. The relief valve according to claim 1, wherein the seal comprises orifices traversed by mounting posts of the plate, free ends of the mounting posts being secured to the gate by being bonded or welded to the gate.

8. The relief valve according to claim 7, wherein the second end of the rim is welded or bonded to the gate.

9. The relief valve according to claim 1, wherein the seal is overmolded onto the gate.

10. The relief valve according to claim 9, wherein material of the seal passes through orifices of the plate and covers a portion of the plate.

11. The relief valve according to claim 10, wherein the material of the seal covers a zone of connection between the intermediate wall and the rim of the plate.

12. The relief valve according to claim 10, wherein the intermediate wall and the rim of the plate comprise orifices for passing the material of the seal.

* * * * *